(12) United States Patent
Folchi et al.

(10) Patent No.: US 9,208,222 B2
(45) Date of Patent: Dec. 8, 2015

(54) NOTE MANAGEMENT METHODS AND SYSTEMS

(75) Inventors: David Folchi, Taoyuan County (TW); Ying-Ju Chen, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 395 days.

(21) Appl. No.: 13/301,192

(22) Filed: Nov. 21, 2011

(65) Prior Publication Data

US 2012/0137255 A1    May 31, 2012

Related U.S. Application Data

(60) Provisional application No. 61/417,400, filed on Nov. 26, 2010.

(51) Int. Cl.
*G06F 17/30* (2006.01)

(52) U.S. Cl.
CPC .... *G06F 17/30716* (2013.01); *G06F 17/30551* (2013.01)

(58) Field of Classification Search
USPC .................. 715/838, 851, 963, 805, 776, 704
See application file for complete search history.

(56) References Cited

U.S. PATENT DOCUMENTS

| | | | |
|---|---|---|---|
| 7,647,555 | B1 | 1/2010 | Wilcox et al. |
| 2005/0069849 | A1* | 3/2005 | McKinney et al. ........... 434/178 |
| 2005/0105374 | A1* | 5/2005 | Finke-Anlauff et al. ...... 365/232 |
| 2008/0244442 | A1 | 10/2008 | Veselova et al. |
| 2009/0287467 | A1* | 11/2009 | Sparks et al. ................... 703/21 |
| 2013/0212534 | A1* | 8/2013 | Knight et al. ................. 715/838 |

FOREIGN PATENT DOCUMENTS

| | | |
|---|---|---|
| CN | 101421713 A | 4/2009 |
| GB | 2 331 437 A | 5/1999 |
| WO | WO 02/57959 A2 | 7/2002 |
| WO | WO 2008/101224 A | 8/2008 |

OTHER PUBLICATIONS

CN Office Action dated Feb. 25, 2014. pp. 1-7.

* cited by examiner

*Primary Examiner* — Peiyong Weng
(74) *Attorney, Agent, or Firm* — Birch, Stewart, Kolasch & Birch, LLP

(57) ABSTRACT

Note management methods and systems are provided. First, inputs are received along a timeline, and at least one note is generated according to the inputs. The at least one note is recorded and arranged along the timeline. In some embodiments, a thumbnail is generated for a respective predefined interval on the timeline according to the at least one note in the respective predefined interval, and the thumbnail of the respective predefined interval is displayed along the timeline.

5 Claims, 6 Drawing Sheets

NOTE MANAGEMENT METHODS AND SYSTEMS

CROSS REFERENCE TO RELATED APPLICATIONS

This Application claims priority of U.S. Provision Application No. 61/417,400, filed on Nov. 26, 2010, the entirety of which is incorporated by reference herein.

BACKGROUND OF THE INVENTION

1. Field of the Invention

The disclosure relates generally to note management methods and systems, and, more particularly to methods and systems that automatically generate and manage notes along a timeline.

2. Description of the Related Art

Recently, portable devices, such as handheld devices, have become more and more technically advanced and multifunctional. For example, a handheld device may receive email messages, have an advanced address book management application, allow media playback, and have various other functions. Because of the conveniences of devices with multiple functions, the devices have become necessities of life.

Handheld devices may be provided with input devices for users to control functions thereof. For example, a handheld device may be equipped with a touch-sensitive device for users to perform required operations. Users can slide their fingers on the touch-sensitive device, and perform operations accordingly. For example, users can activate a note application, and make notes by sliding their fingers on the touch-sensitive device.

Using the note application, users can generate notes at will. Currently, the notes are generated as files, and stored in a same pool. Generally, it is hard for users to manage the notes when a large amount of notes are simultaneously in a same pool. For example, when review of a specific note is needed, it may be hard to locate the specific note in the pool. Thus, there is a need for note management mechanisms that permit users to easily and efficiently generate and manage notes.

BRIEF SUMMARY OF THE INVENTION

Note management methods and systems are provided.

In an embodiment of a note management method, inputs are received along a timeline, and at least one note is generated according to the inputs. The at least one note is recorded and arranged along the timeline.

An embodiment of a note management system includes a storage unit, an interface, and a processing unit. Inputs are received via an interface along a timeline. The processing unit generates at least one note according to the inputs, and records the at least one note, which is arranged along the timeline, to the storage unit.

In some embodiments, a thumbnail is generated for a respective predefined interval on the timeline according to the at least one note in the respective predefined interval, and the thumbnail of the respective predefined interval is displayed along the timeline.

In some embodiments, it is determined whether at least one note is generated in the respective predefined interval. When at least one note is generated in the respective predefined interval, the thumbnail is generated for the respective predefined interval according to the at least one note in the respective predefined interval.

In some embodiments, a larger image corresponding to the thumbnail is displayed when the thumbnail is designated.

Note management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Note management methods and systems are provided.

Figure 1:
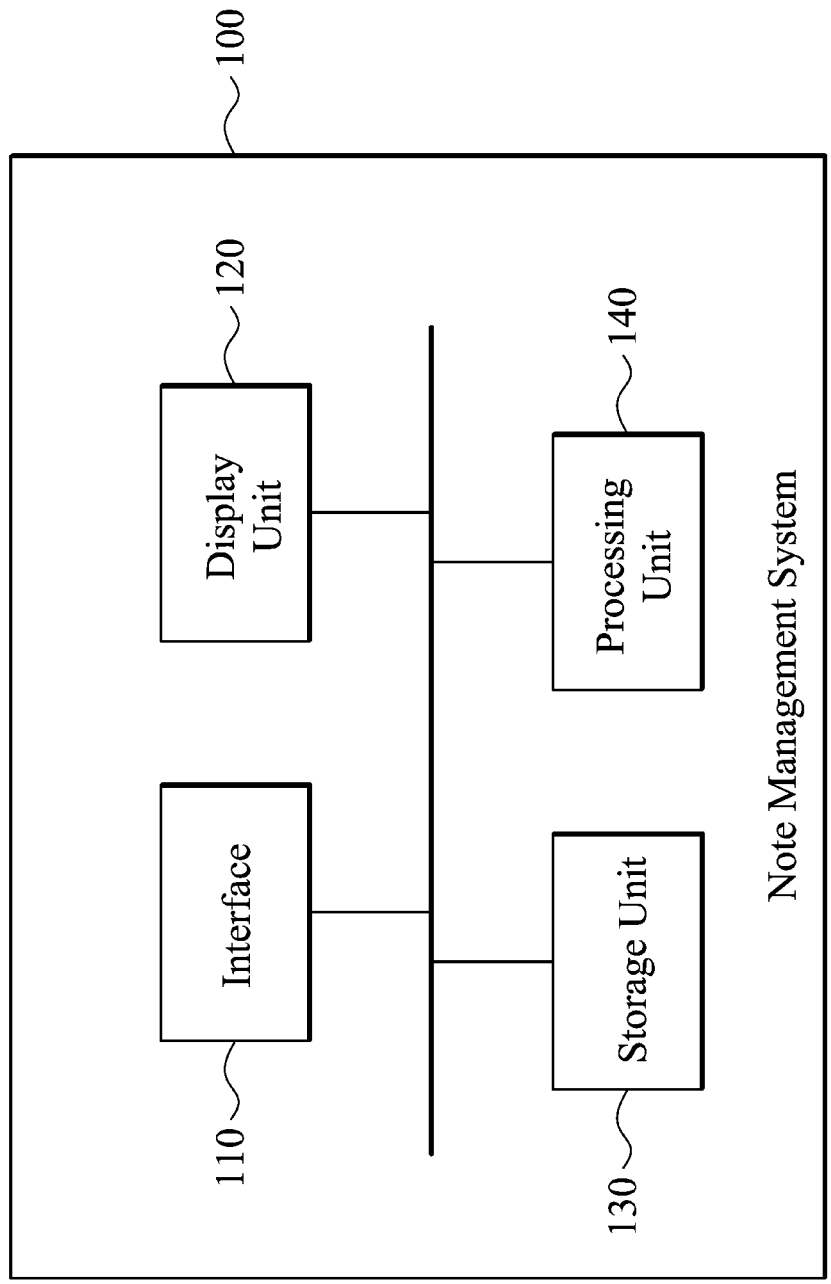
FIG. 1 is a schematic diagram illustrating an embodiment of a note management system of the invention.

FIG. 1 is a schematic diagram illustrating an embodiment of a note management system of the invention. The note management system 100 can be used in an electronic device, such as a PDA (Personal Digital Assistant), a smart phone, a mobile phone, an MID (Mobile Internet Device, MID), a laptop computer, a car computer, a digital camera, a multimedia player, a game device, or any other type of mobile computational device, however, it is to be understood that the invention is not limited thereto.

The note management system 100 comprises an interface 110, a display unit 120, a storage unit 130, and a processing unit 140. The interface 110 can be used to receive related inputs along a timeline. It is understood that, in some embodiments, the interface 110 may be a touch-sensitive device, and the inputs may be gestures corresponding to contacts and movements of an input tool (object), such as a stylus or a finger on the touch-sensitive device. In some embodiments, the interface 110 may be a touch-sensitive device or a keyboard, and the inputs may be text inputted via the touch-sensitive device or the keyboard. In some embodiments, the interface 110 may be a microphone, and the inputs may be audio received via the microphone. In some embodiments, the interface 110 may be an image capture unit, and the inputs may be photos captured by the image capture unit. It is understood that, in some embodiments, the inputs may be photos, files, attachments, and/or related data stored in the storage unit 130. It is noted that, the above interfaces are examples of the present application, and the present invention is not limited thereto. The display unit 120 can display related data, such as user interfaces, notes, and others. It is understood that, in some embodiments, the display unit 120 may be integrated with a touch-sensitive device to form a touch-sensitive display unit. The touch-sensitive device has a touch-sensitive surface comprising sensors in at least one dimension to detect contact and movement of an input tool near or on the touch-sensitive surface. The storage unit 130 may be a built-in memory, or an external memory card, which stores related data, and provides data to the display unit 120 for display. The processing unit 140 can perform the note management method along a timeline of the present invention, which will be discussed further in the following paragraphs.

Figure 2:
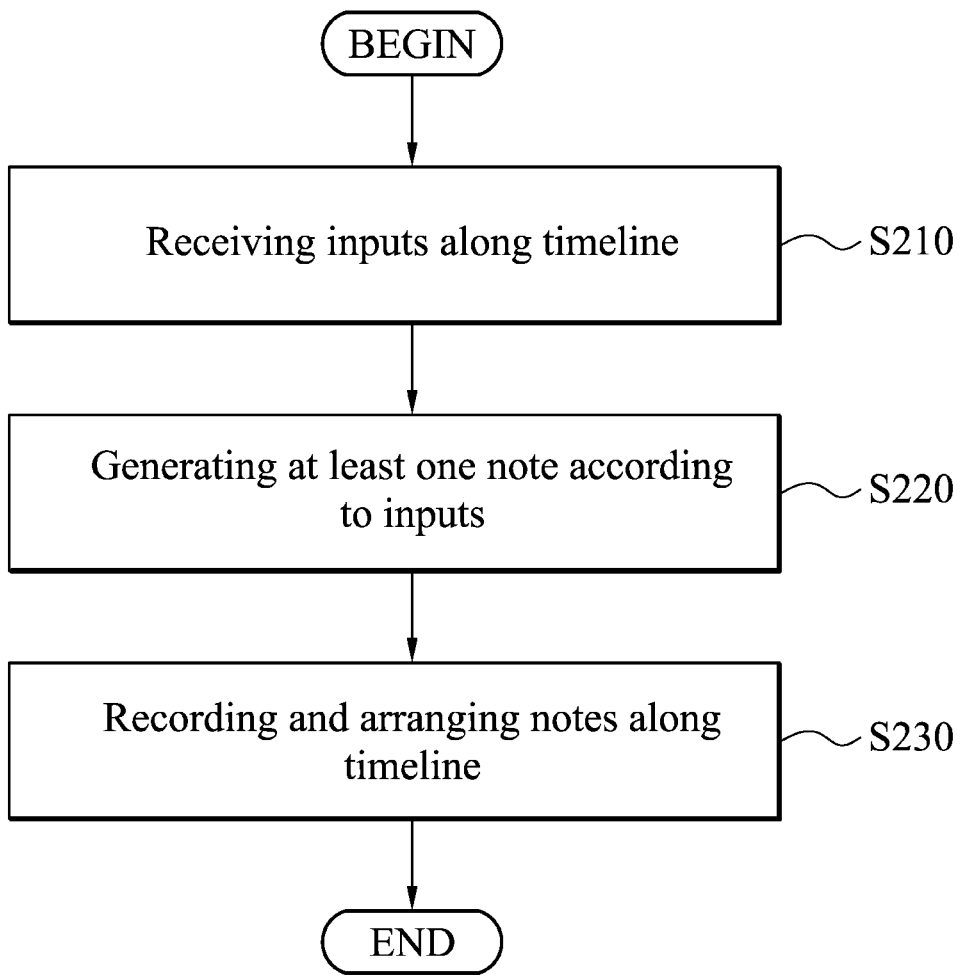
FIG. 2 is a flowchart of an embodiment of a note management method of the invention.

FIG. 2 is a flowchart of an embodiment of a note management method of the invention. The note management method can be used for an electronic device, such as a PDA, a smart phone, a mobile phone, an MID, a laptop computer, a car computer, a digital camera, a multi-media player or a game device.

In step S210, inputs are received along a timeline. It is understood that, in some embodiments, the inputs may be gestures corresponding to contacts and movements of an input tool (object) on a touch-sensitive display unit, texts, files, photos, audio, and/or attachments. It is also understood that, in some embodiments, the inputs may be received via an interface, such as a touch-sensitive device, a keyboard, a microphone, or an image capture unit. It is noted that, the above inputs and interfaces are examples of the present application, and the present invention is not limited thereto. In step S220, at least one note is generated according to the inputs. In step S230, the at least one note is recorded and arranged along the timeline. It is understood that, in some embodiments, each note is generated with a timestamp, and the notes are arranged based on the corresponding timestamps.

Figure 3:
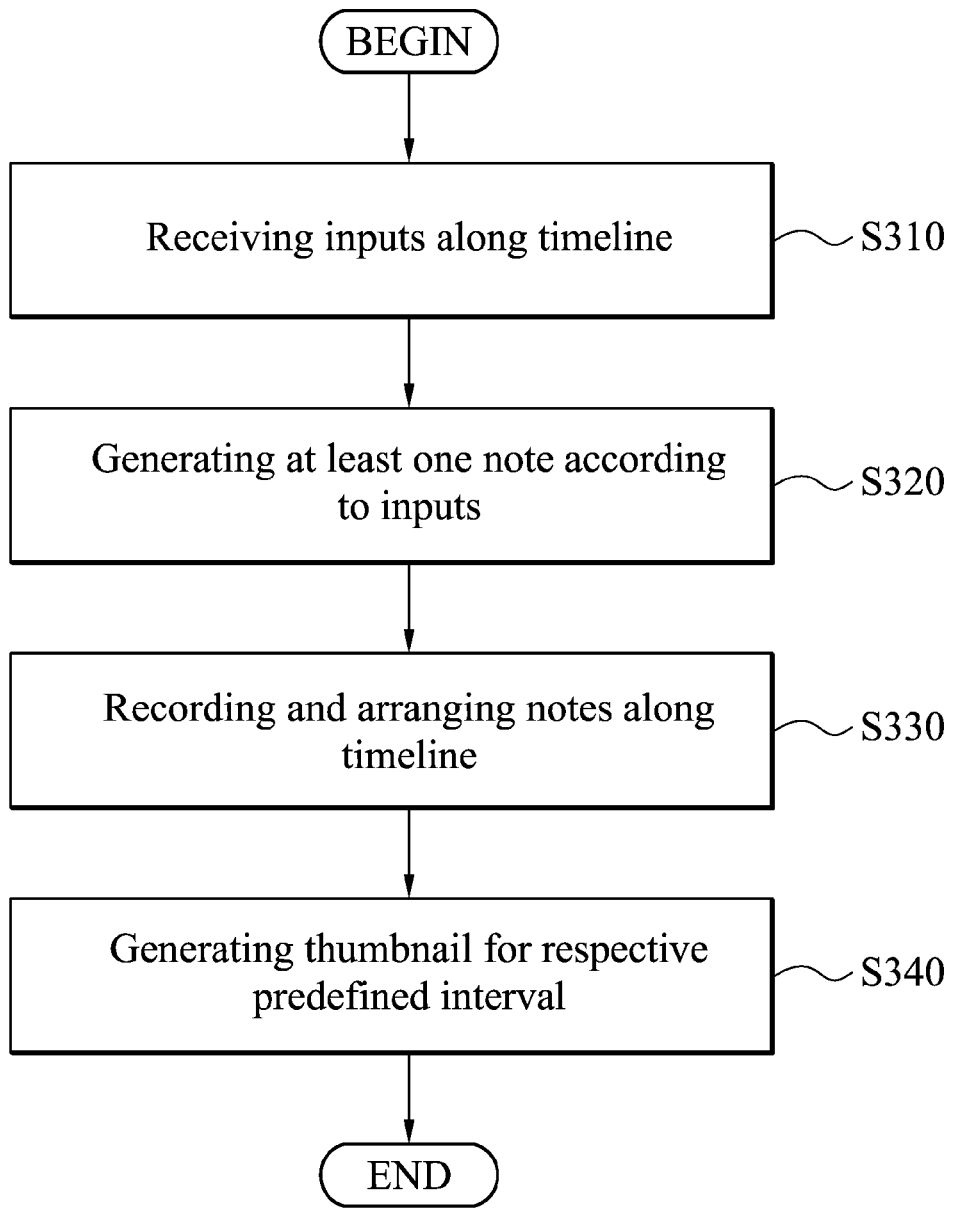
FIG. 3 is a flowchart of another embodiment of a note management method of the invention.

FIG. 3 is a flowchart of another embodiment of a note management method of the invention. The note management method can be used for an electronic device, such as a PDA, a smart phone, a mobile phone, an MID, a laptop computer, a car computer, a digital camera, a multi-media player or a game device. In this embodiment, a timeline is divided into a plurality of predefined intervals, and a thumbnail is generated for the respective predefined interval.

In step S310, inputs are received along a timeline. Similarly, in some embodiments, the inputs may be gestures corresponding to contacts and movements of an input tool (object) on a touch-sensitive display unit, texts, files, photos, audio, and/or attachments. Similarly, in some embodiments, the inputs may be received via an interface, such as a touch-sensitive device, a keyboard, a microphone, or an image capture unit. It is noted that, the above inputs and interfaces are examples of the present application, and the present invention is not limited thereto. In step S320, at least one note is generated according to the inputs. In step S330, the at least one note is recorded and arranged along the timeline. In step S340, a thumbnail is generated for a respective predefined interval on the timeline. It is understood that, in some embodiments, the thumbnail of the respective predefined interval can be displayed along the timeline.

Figure 4:
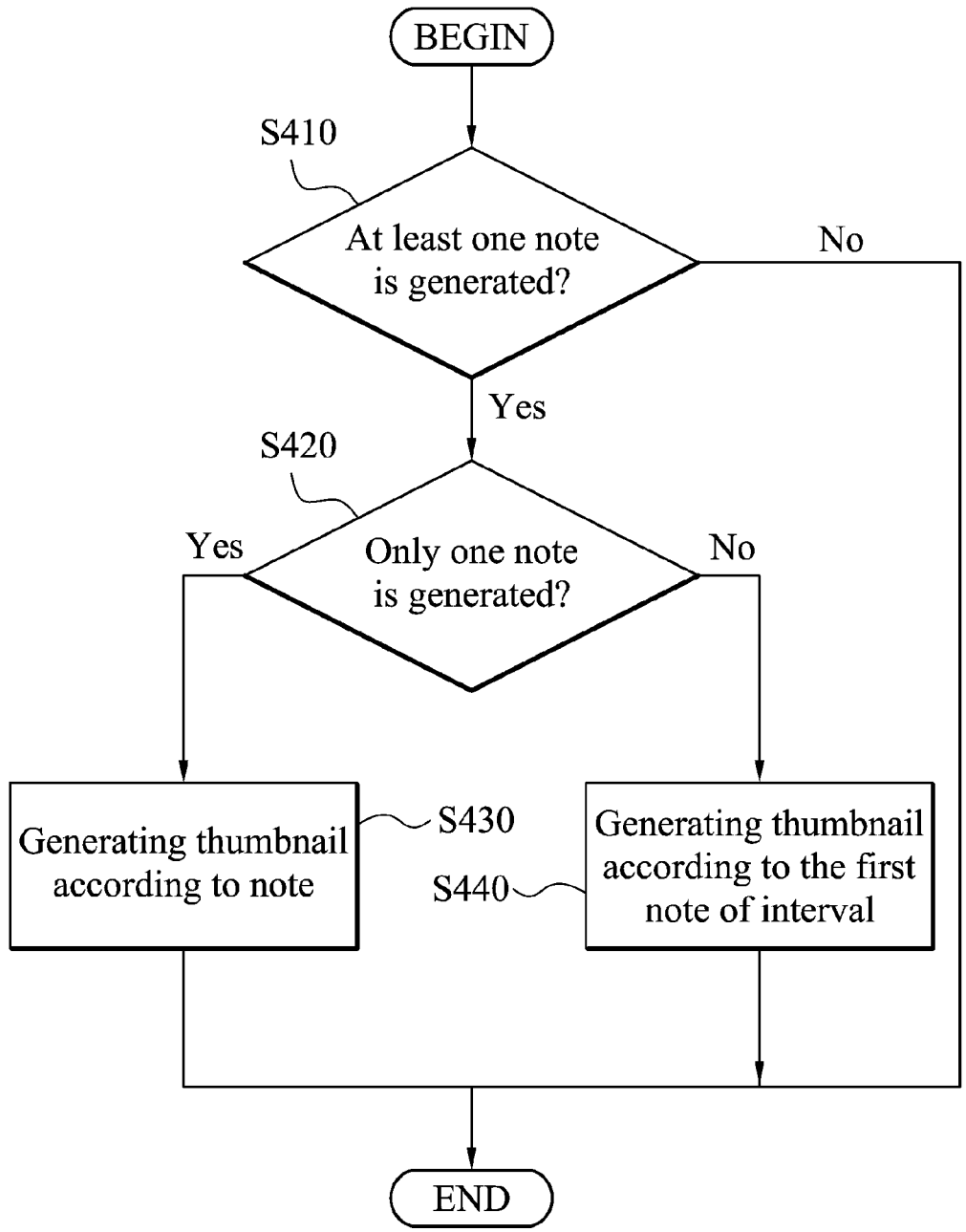
FIG. 4 is a flowchart of an embodiment of a method for generating a thumbnail for a predefined interval of the invention.

It is understood that, the thumbnail can be generated according to at least one note in the respective predefined interval. FIG. 4 is a flowchart of an embodiment of a method for generating a thumbnail for a predefined interval of the invention. In step S410, it is determined whether at least one note is generated in the predefined interval. If no note is generated in the predefined interval (No in step S410), the procedure is terminated. If at least one note is generated in the predefined interval (Yes in step S410), in step S420, it is determined whether only one note is generated in the predefined interval. If only one note is generated in the predefined interval (Yes in step S420), in step S430, a thumbnail is generated according to the note in the predefined interval. If two or more notes are generated in the predefined interval (No in step S420), in step S440, a thumbnail is generated according to the first note in the predefined interval.

It is understood that, as described, the inputs may be gestures, texts, files, photos, audio, and/or attachments. In some embodiments, a thumbnail can be generated for each kind of the inputs, and the thumbnails of the respective predefined intervals for each kind of the inputs can be displayed along the timeline.

Figure 5:
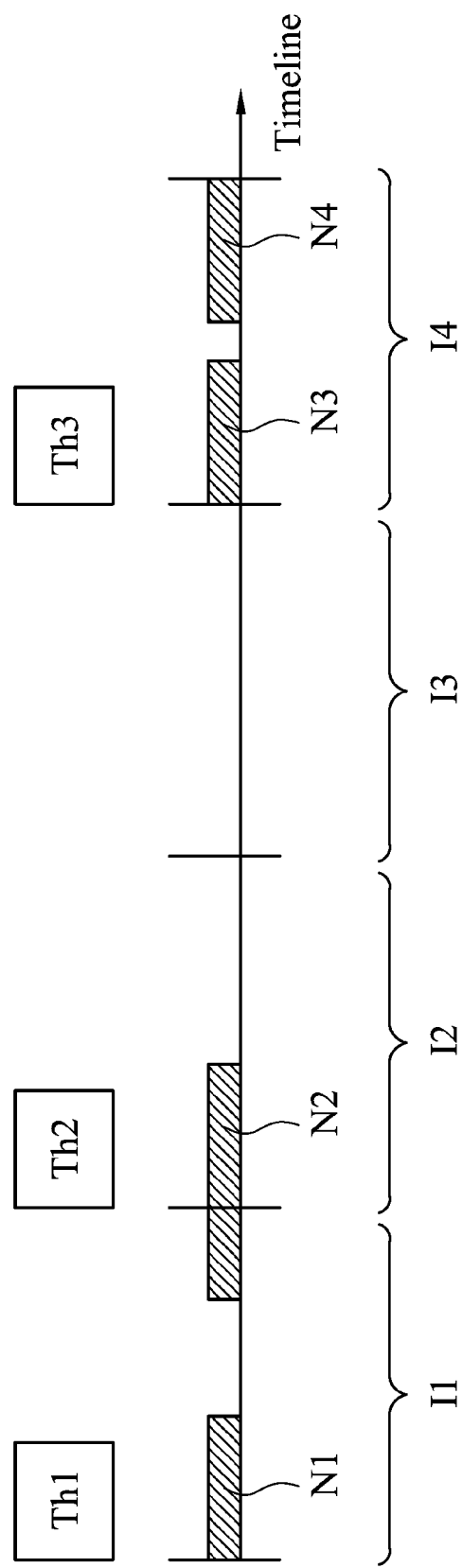
FIG. 5 is a schematic diagram illustrating an embodiment of an example of thumbnails for predefined intervals with notes along a timeline of the invention.

FIG. 5 is a schematic diagram illustrating an embodiment of an example of thumbnails for predefined intervals with notes along a timeline of the invention. As shown in FIG. 5, four intervals I1, I2, I3 and I4 are arranged along a timeline, wherein note N1 is generated during interval I1, and note N2 is generated during interval I1 and ends during interval I2, and notes N3 and N4 are generated during interval I4. It is noted that, no note is generated during interval I3. Since two notes (N1 and N2) are generated during interval I1, the thumbnail Th1 is generated for interval I1 according to the first note N1. Since only one note (N2) is generated during interval I2, the thumbnail Th2 is generated for interval I2 according to note N2. Since no note is generated during interval I3, no thumbnail is generated for interval I3. Similarly, since two notes (N3 and N4) are generated during interval I4, the thumbnail Th3 is generated for interval I4 according to the first note N3.

Figure 6:
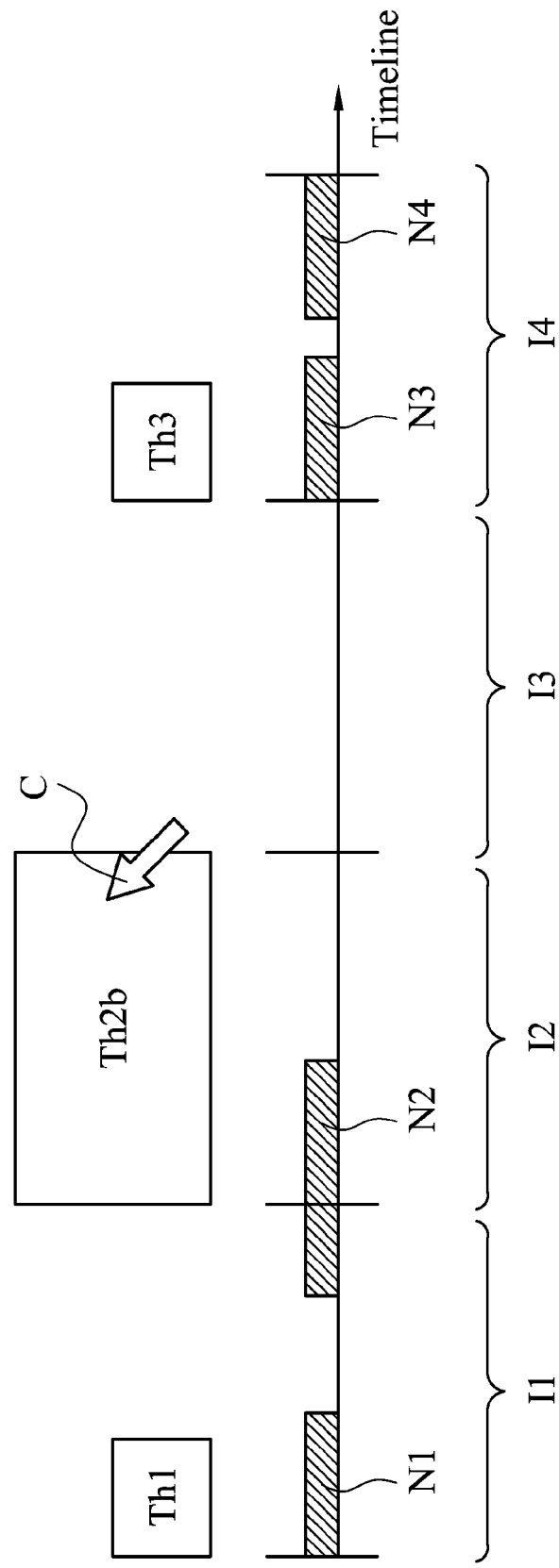
FIG. 6 is a schematic diagram illustrating an embodiment of an example of a larger image corresponding to a thumbnail when the thumbnail is designated of the invention.

In some embodiments, the thumbnails for predefined intervals with notes along a timeline can be displayed via the display unit. Users can easily manage the notes by browsing the schematic diagrams of the notes, and the thumbnails for the respective intervals. It is understood that, in some embodiments, a larger image corresponding to a thumbnail is displayed when the thumbnail is designated. For example, when thumbnail Th2 in FIG. 5 is designated by a pointer C, a larger image Th2b is displayed, as shown in FIG. 6.

Therefore, the note management methods and systems of the invention can automatically generate and manage notes along a timeline, thus improving efficiency of note generation and management.

Note management methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer-implemented note management method for use in an electronic device, comprising:

receiving inputs via an interface;

generating at least one note with a timestamp according to the inputs;

recording the at least one note and arranging the at least one note along a timeline based on the timestamp;

dividing the timeline into a plurality of predefined intervals;

generating a thumbnail for the predefined interval in response to determining at least one note is recorded in the predefined interval on the timeline; and displaying the thumbnail of the predefined interval along the timeline, wherein the step of generating the thumbnail for the predefined interval comprising:

determining whether a first note and a second note are generated in the predefined interval, wherein the first note is generated prior to the second note; and generating the thumbnail for the predefined interval according to the first note in response to determining the first note and the second note are generated in the predefined interval.

2. The method of claim 1, wherein the inputs comprise gestures corresponding to contacts and movements of an object on a touch-sensitive display unit, texts, photos, audio, or attachments.

3. A note management system for use in an electronic device, comprising:

a hardware storage unit;

an interface receiving inputs; and a processing unit generating at least one note with a timestamp according to the inputs, and recording the at least one note and arranging the at least one note along a timeline based on the timestamp, to the storage unit, and dividing the timeline into a plurality of predefined intervals, wherein the processing unit further generates a thumbnail for the predefined interval in response to determining at least one note is recorded in the predefined interval on the timeline, and displays the thumbnail of the predefined interval along the timeline in a display unit, and wherein the processing unit further determines whether a first note and a second note are generated in the predefined interval, wherein the first note is generated prior to the second note, and generates the thumbnail for the predefined interval according to the first note in response to determining the first note and the second note are generated in the predefined interval.

4. The system of claim 3, wherein the inputs comprise gestures corresponding to contacts and movements of an object on a touch-sensitive display unit, texts, photos, audio, or attachments.

5. A non-transitory machine-readable storage medium comprising a computer program, which, when executed, causes a device to perform a note management method, comprising:

receiving inputs via an interface;

generating at least one note with a timestamp according to the inputs;

recording the at least one note and arranging the at least one note along a timeline based on the timestamp;

dividing the timeline into a plurality of predefined intervals;

generating a thumbnail for the predefined interval in response to determining at least one note is recorded in the predefined interval on the timeline; and displaying the thumbnail of the predefined interval along the timeline, wherein a step of generating the thumbnail for the predefined interval comprising:

determining whether a first note and a second note are generated in the predefined interval, wherein the first note is generated prior to the second note; and generating the thumbnail for the predefined interval according to the first note in response to determining the first note and the second note are generated in the predefined interval.

* * * * *